Jan. 19, 1943.  F. DIEFFENBACH  2,308,496
FOLDING SEAT
Filed July 28, 1941  2 Sheets-Sheet 2
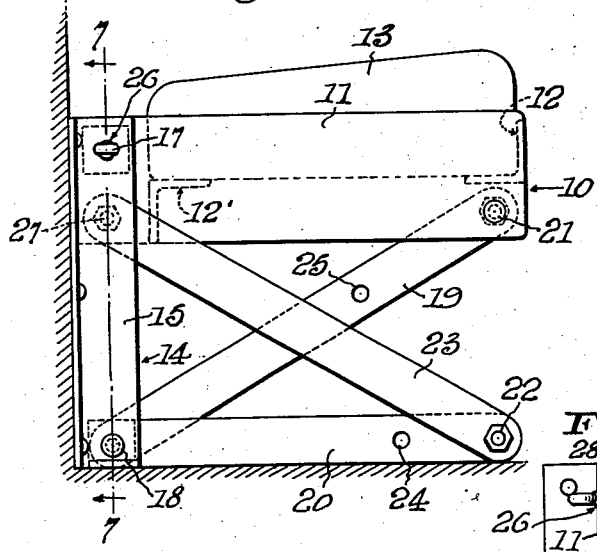
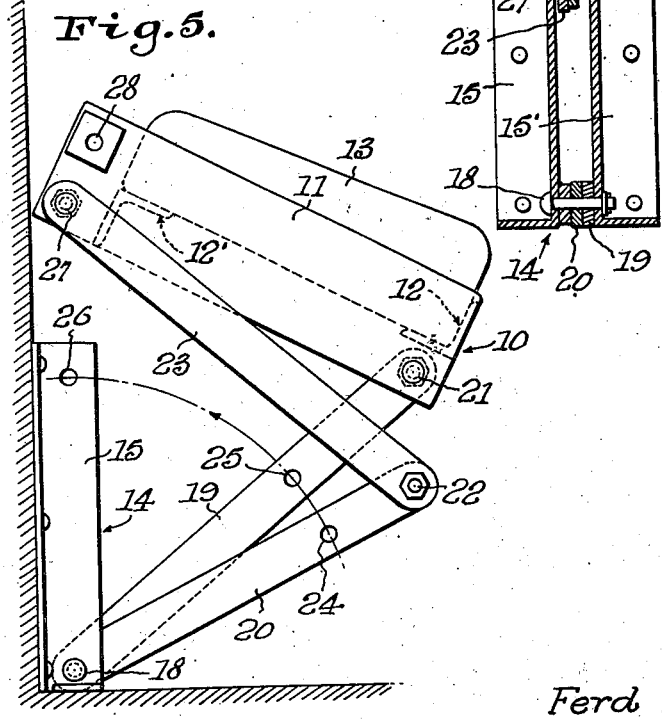
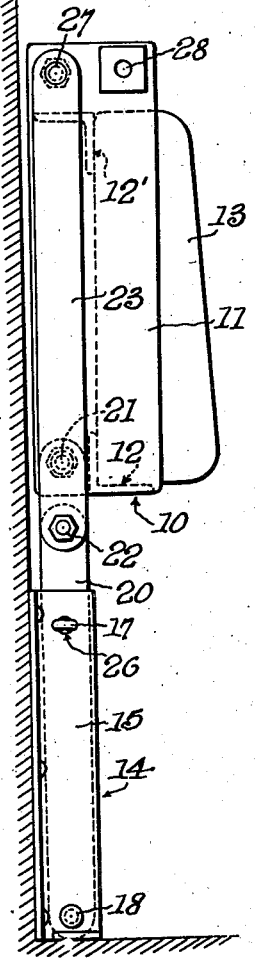
Inventor
Ferd Dieffenbach Patented Jan. 19, 1943

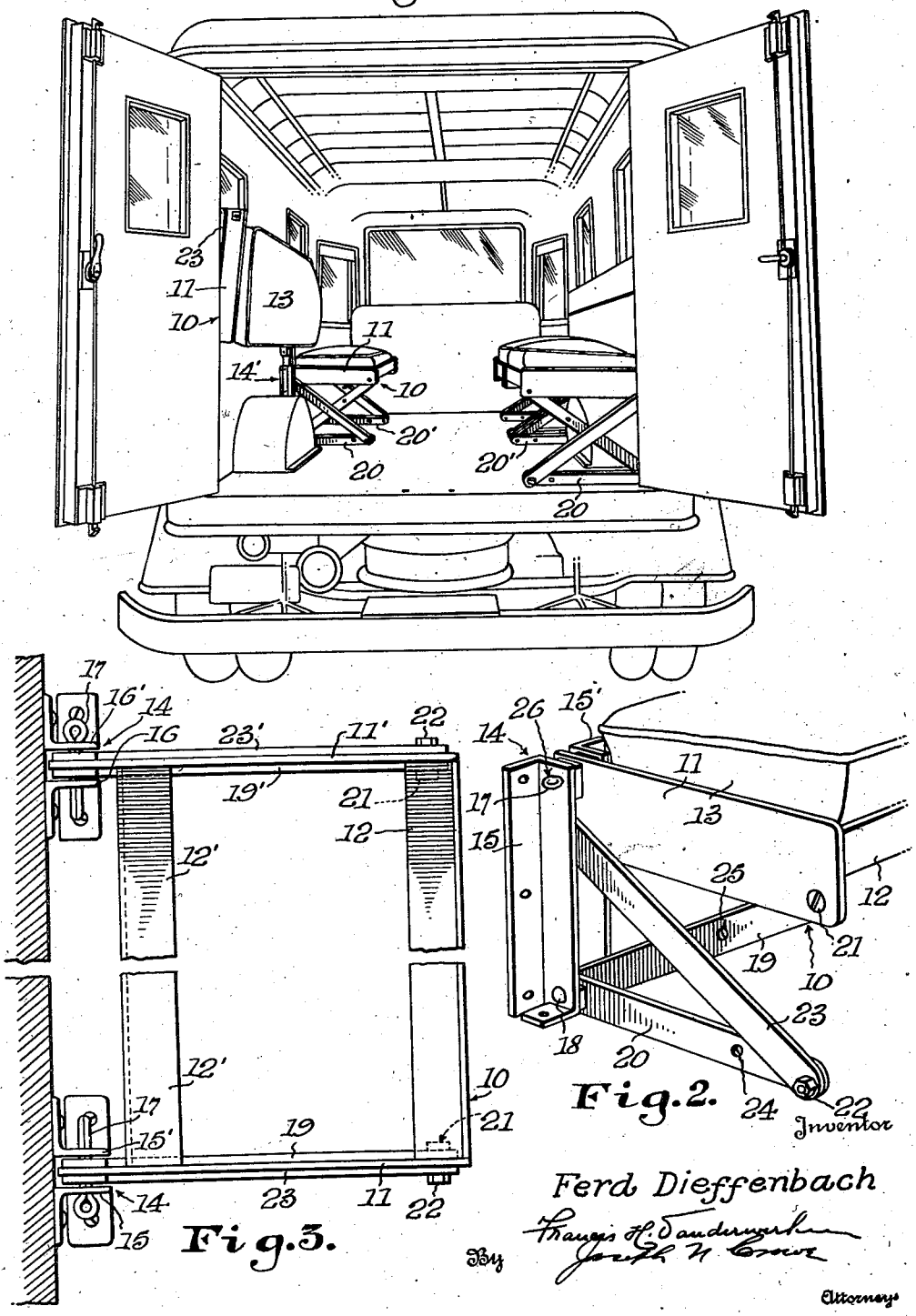

2,308,496

UNITED STATES PATENT OFFICE 2,308,496

FOLDING SEAT

Ferd Dieffenbach, Pittsburgh, Pa.

Application July 28, 1941, Serial No. 404,282

7 Claims. (Cl. 155—83)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to folding seats, but more particularly to a seat of this type which is especially adapted for use in ambulances, wagons and other vehicles.

One object of the invention is to provide a folding seat for motor vehicles which will adapt the vehicle for transporting both freight and passengers.

Another object of the invention is to provide a seat of this type which is adapted to fold against the walls of a vehicle with its cushion surface toward the center of the body, to thereby protect the cushion from rubbing against the wall or coming into contact with loads on the floor thereof.

Another object of the invention is to provide a folding seat for vehicles which when not being used for occupancy by passengers can be so folded out of the way so as to allow practically all the loading space of a truck to be used for the hauling of freight.

Another object of the invention is to provide a folding seat which is of simple design, which may be constructed entirely of standard commercial structural steel parts, which may be easily folded and unfolded by one person and one which requires no special technique, craft, or equipment for the construction thereof, and can therefore be manufactured and installed at a low cost.

Another object of the invention is to provide a folding seat which is so designed that the stress due to loading by virtue of occupancy is sustained by the seat structure itself and is not dependent upon the truck walls for support.

Another object of the invention is to provide a folding seat which may be attached to either the floor or wall of the vehicle or to both, but one which does not impose any load on the wall of the vehicle by virtue of its own weight or the weight of the occupants.

With these and other objects in view, this invention consists in certain novel details of construction, combination and arrangement of parts to be more fully hereinafter described and claimed.

Referring to the drawings in which corresponding parts are indicated by similar reference characters:

Fig. 1 is a rear perspective view of a vehicle in which the folding seats have been installed, which shows the seats in unfolded position;

Fig. 2 is a perspective of one end of a seat in unfolded position;

Fig. 3 is a top plan view showing the seat frame with cushion removed;

Fig. 4 is an end elevation showing the seat in open or unfolded position;

Fig. 5 is an end elevation showing the seat in a partially folded position;

Fig. 6 is an end elevation showing the seat in folded position, and

Fig. 7 is a detail vertical section taken on line 7—7 of Fig. 4.

The seat structure comprises a rectangular seat or cushion frame 10 composed of parallel end members or bars 11 and 11' connected by front and rear members formed as angle bars 12 and 12' which form a support for a seat or cushion 13, as shown in the figures. The end members 11 and 11' are supported by vertically arranged brackets 14 and 14' which are attached to a wall of the vehicle, the brackets being composed of suitably spaced angle bars 15, 15' and 16, 16', drilled near their upper extremities to receive cotter pins 17, which pass through holes 28 drilled at the rear of the end bars 11 and 11' of the cushion frame 10 to thus form a pivotal mounting at the rear of said frame.

The angles 15, 15' and 16, 16' forming the brackets 14 and 14' are also drilled near their lower extremities for the reception of bolts 18 to which are pivotally connected the bracing bars 19 and 19' and the bracket links 20 and 20'.

The bracing bars 19 and 19' are pivotally connected by the bolts 21 to the forward portion of the end members 11 and 11' of the cushion frame 10 and form a support for the outer end of the seat. The bracket links 20 and 20' are pivotally connected by bolts 22 to frame links 23 and 23', the latter being connected to the rear of the frame 10 by the bolts 27.

The bracing bars 19 and 19' and the bracket links 20 and 20' are drilled at the same distance from their pivotal mountings 18 at the base of the brackets as the distance between these pivotal mountings and the holes 26 in the upper portions of the brackets for the reception of the cotter pins 17. These holes 24 and 25 in the bracket links, and bracing bars will thus register with the upper holes 26 of the brackets when the seat is in a raised or folded position as will be further explained.

When the seat is in an unfolded position for use, the rear of the cushion frame 10 is pivotally connected to the brackets 14 and 14', the bearing bars 19 and 19' support the forward portion of the seat, the bracket links 20 and 20' rest upon the floor of the vehicle, and the frame links extend diagonally rearward to their pivotal connections 27 with the cushion frame.

To fold the seat the cotter pins 17 are removed from the brackets 14 and 14' and the rear of the seat elevated above the forward portion thereof, as shown in Fig. 5. With further elevation of the seat the bracing bars 19 and 19' and the bracket links 20 and 20' will align themselves with the angles forming the brackets 14 and 14' until the openings 24 and 25 therein register with cotter pin holes 26 in the brackets. The cotter pins 17 are then inserted through the aligned openings in the brackets, the bracing bars, and the bracket links to retain the seat in an upright position.

Having described my invention, what I claim as new and wish to secure by Letters Patent:

1. A folding seat adapted for attachment to the walls of a vehicle comprising, vertically extending wall brackets, a cushion frame detachably connected at its rear to the upper portion of said wall brackets, bracing bars pivotally connected to the forward portion of said frame and to the lower portion of said brackets, and pivotally united links pivotally connected to the rear portion of said frame and to the lower portion of said brackets, whereby the frame, when disconnected from said brackets, may be moved into a vertical position, and means for retaining the frame in said position.

2. A folding seat adapted for attachment to the walls of a vehicle comprising, vertically extending wall brackets provided with cotter pin openings, a cushion frame, means comprising cotter pins for detachably connecting said frame to said brackets, bracing bars pivotally connected to said cushion frame and to said brackets, and pivotally united links pivotally connected to said frame and to said brackets, whereby the frame, when disconnected from said brackets, may be moved into a vertical position, and means for retaining the frame in said position.

3. A folding seat adapted for attachment to the walls of a vehicle comprising, vertically extending wall brackets, provided with cotter pins openings, a frame adapted to support a cushion, means comprising cotter pins for detachably connecting said frame to said brackets, bracing bars provided with cotter pin openings and pivotally connected to said frame and to said brackets, and pivotally united links provided with cotter pin openings and pivotally connected to said frame and to said brackets, whereby the frame when disconnected from said brackets may be moved into a vertical position to effect an alignment of said cotter pin openings in the bracing bars, the links, and the brackets, and the frame retained in said position by the insertion of cotter pins through the aligned openings.

4. A folding seat adapted for attachment to the walls of a vehicle comprising vertically extending wall brackets, a cushion frame detachably connected at the rear thereof to the upper portion of said brackets, bracing bars pivotally connected to the forward portion of said frame and with the lower portion of said brackets adapted to retain the frame in horizontal position when it is detachably connected to said brackets, links pivotally connected to each other and to the rear of said frame and pivotally connected to the lower portion of said brackets at the pivotal connection of said bracing bars, said links being adapted to extend to the rear portion of said frame when it is detached from the brackets and moved into a vertical upright position, and means in connection with the bracing bars, the links, and the brackets, for retaining the frame in an upright position.

5. A folding wall seat, comprising vertically extending wall brackets provided with pivot holes adjacent their upper and lower extremities, bracket links and bracing bars pivotally connected to said wall brackets at the lower pivot holes and provided with openings adapted to register with the pivot holes at the upper extremities of said wall brackets, frame links pivotally connected to said bracket links, a seat frame pivotally connected to said bracing bars at its forward extremity and to said frame links at its rearward extremity, and means comprising pin members adapted to detachably connect the seat frame at the pivot holes in the upper extremity of said wall brackets to retain the same in unfolded position and to detachably connect the bracket links and bracing bars to said wall brackets at the holes therein which register with the upper pivot holes of said brackets to retain the seat in folded position.

6. A folding wall seat, comprising vertically extending wall brackets provided with pivot holes adjacent their upper extremities, bracket links and bracing bars pivotally connected to said wall brackets adjacent their lower extremities, said bracket links and bracing bars being provided with openings adapted to register with the pivot holes adjacent the upper extremities of said wall brackets, frame links pivotally connected to said bracing bars, a seat, a seat frame adapted to support said seat, said seat frame being pivotally connected to said bracing bars adjacent its forward extremity and to said frame links adjacent its rearward extremity, and provided with holes adjacent its rearward extremity adapted to register with the pivot holes adjacent the upper extremities of said wall brackets, and pin members adapted for insertion within the holes adjacent the rear of said seat frame and adjacent the upper extremity of said wall brackets to retain the seat in unfolded position, and for insertion within the holes in said bracing bars, bracket links, and said wall brackets when in aligned position to retain the seat in folded position.

7. A folding wall seat, comprising vertically extending wall brackets provided with pivot holes adjacent their upper extremities, bracket links and bracing bars pivotally connected to said wall brackets adjacent their lower extremities, said bracket links and bracing bars being provided with openings adapted to register with the pivot holes adjacent the upper extremities of said wall brackets, frame links pivotally connected to said bracing bars, a seat, a rectangular seat frame formed with front, rear, and end members adapted to support said seat, said end members being pivotally connected to said bracing bars adjacent their forward extremity and to said frame links adjacent their rearward extremity and provided with holes adjacent their rearward extremity adapted to register with the pivot holes adjacent the upper extremities of said wall brackets and pin members adapted for insertion within the holes adjacent the rear of said end members and adjacent the upper extremity of said wall brackets to retain the seat in unfolded position, and for insertion within the holes in said bracing bars, bracket links, and said wall brackets when in aligned position to retain the seat in folded position.

FERD DIEFFENBACH.